(12) United States Patent
Duda et al.

(10) Patent No.: US 9,030,931 B2
(45) Date of Patent: May 12, 2015

(54) LATENCY ANALYSIS OF TRAFFIC PASSING THROUGH AN ETHERNET SWITCH

(75) Inventors: Kenneth J. Duda, Menlo Park, CA (US); Anshul Sadana, Santa Clara, CA (US); Hugh W. Holbrook, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 178 days.

(21) Appl. No.: 13/420,527

(22) Filed: Mar. 14, 2012

(65) Prior Publication Data

US 2012/0236723 A1    Sep. 20, 2012

Related U.S. Application Data

(60) Provisional application No. 61/452,634, filed on Mar. 14, 2011.

(51) Int. Cl.
| | |
|---|---|
| *H04L 12/26* | (2006.01) |
| *H04L 12/801* | (2013.01) |
| *H04L 12/939* | (2013.01) |
| *H04L 12/841* | (2013.01) |
| *H04L 12/835* | (2013.01) |
| *H04L 12/931* | (2013.01) |

(52) U.S. Cl.
CPC .......... *H04L 43/0852* (2013.01); *H04L 43/106* (2013.01); *H04L 47/11* (2013.01); *H04L 47/28* (2013.01); *H04L 47/30* (2013.01); *H04L 49/351* (2013.01); *H04L 49/555* (2013.01)

(58) Field of Classification Search
USPC ....................... 370/229, 230, 230.1, 232, 236
See application file for complete search history.

(56) References Cited

U.S. PATENT DOCUMENTS

| | | | |
|---|---|---|---|
| 6,493,318 B1* | 12/2002 | Bare | 370/238 |
| 6,560,648 B1 | 5/2003 | Dunn et al. | |
| 6,757,282 B1* | 6/2004 | Ofek | 370/389 |
| 7,864,816 B1* | 1/2011 | Cohen | 370/516 |
| 2004/0179473 A1* | 9/2004 | Thibodeau et al. | 370/229 |
| 2007/0076754 A1* | 4/2007 | Krishnaswamy | 370/468 |
| 2008/0052401 A1* | 2/2008 | Bugenhagen et al. | 709/227 |
| 2010/0293243 A1 | 11/2010 | Wittwer | |
| 2011/0019558 A1 | 1/2011 | Rowe et al. | |

\* cited by examiner

*Primary Examiner* — Andrew Chriss
*Assistant Examiner* — Jose Perez
(74) *Attorney, Agent, or Firm* — Osha • Liang LLP

(57) ABSTRACT

A method for accurately measuring, recording and reporting latency of an Ethernet switch is disclosed. Various packet queues in the switch are monitored at any given time and forwarding latency is calculated. Latency data from multiple switching elements in a network is collected to provide end-to-end forwarding latency of a system.

3 Claims, 4 Drawing Sheets

LATENCY ANALYSIS OF TRAFFIC PASSING THROUGH AN ETHERNET SWITCH

CROSS-REFERENCE TO RELATED APPLICATIONS

This application claims priority from U.S. Provisional Patent Application 61/452634 filed Mar. 14, 2011, which is incorporated herein by reference.

FIELD OF THE INVENTION

The present invention relates generally to techniques for networking test and measurement. More particularly, it relates to measuring and recording the latency of Ethernet switches under load.

BACKGROUND OF THE INVENTION

An Ethernet switch commonly has a fixed forwarding latency for packet transmission. However, under congestion, queuing delays add to the forwarding latency and add variability that has been hard to measure, or predict, at any given time.

There have been many advancements in managing congestion in a network using quality of service and various congestion notifications. Examples of the state of the art in this field are the teachings of U.S. Pat. No. 6,560,648, US 2010/0293243, and US 2011/0019558.

These common techniques, however, do not provide any information about the latency of the network. In addition, network latency, as measured by round trip from point A to point B provides the average latency over a time window but does not provide any further detail on where the delays occurred and exactly at what time.

Another limitation with known techniques is that they only provide the lowest or best-case latency, which is insufficient in newer low latency applications. Forwarding latency of switches used to be tens of microseconds but is decreasing with newer technology. Achieving low latency has become essential in high-speed systems used for high frequency trading and other high performance computing applications. High latency caused by network congestion has a major negative impact on these types of applications. The known tools, however, are not able to provide the needed information in these newer circumstances.

In view of the above, there is a need for improved techniques for networking test and measurement.

SUMMARY OF THE INVENTION

Accordingly, in one aspect, the present invention provides an improved latency analysis and monitoring technique that allows real time monitoring of latency and congestion conditions in both individual network switches and in a network of networking switches. This technique allows network congestion to be detected immediately such that corrective steps can be taken. The technique is also able to monitor the actual latency on an on-going basis in order to ensure optimal network performance during operation.

One embodiment of the invention provides a technique for measuring and recording the latency of Ethernet switches under load, taking into account any queue congestion. Latency data from all Ethernet switching elements is collected and analyzed to present end-to-end latency of a network at any given time.

In one aspect, a method is implemented by a network switch comprising a control processor, a queue monitor, network interface ports, corresponding packet queues, and a network management port. The method includes reading depths of the packet queues; recording the depths together with corresponding timestamps; and transmitting the depths and corresponding timestamps from the network management port in response to a request received from a network management system.

In another aspect, a method is implemented by a network switch management system connected to a network comprising multiple network switches and multiple servers. The method includes transmitting to the network switches requests for depths of packet queues together with corresponding timestamps; receiving from the network switches the requested depths of the packet queues together with the corresponding timestamps; calculating latencies of interface ports of the network switches from the received depths of the packet queues; and calculating an end-to-end latency of the network between two servers by adding the calculated latencies of the interface ports.

DETAILED DESCRIPTION

Figure 1:
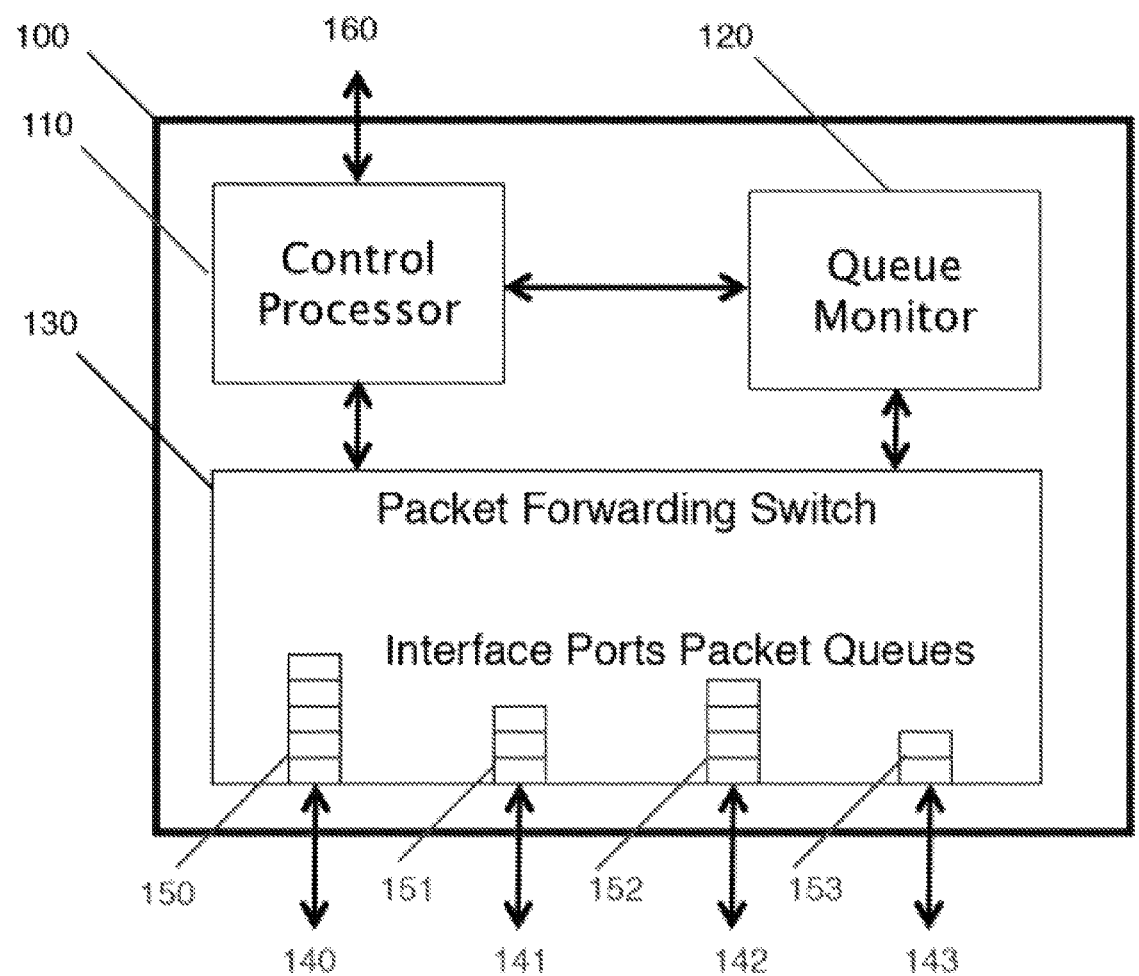
FIG. 1 is a schematic block diagram of a network switch with queue monitoring, according to an embodiment of the invention.

FIG. 1 shows the internal architecture of a network switch 100 comprised of Control Processor 110, Queue Monitor 120, and Packet forwarding switch 130, each of which is communicatively connected to the other two.

As shown, Packet forwarding switch 130 has interface ports 140, 141, 142, 143 that can be used to connect the switch 100 to other network switches, routers, servers, or other network devices. Associated with the interface ports are corresponding packet queues 150, 151, 152, 153 located in the packet forwarding switch 130. The Control Processor 110 has a Management Port 160 which allows the switch 100 to connect to a management network.

Figure 3:
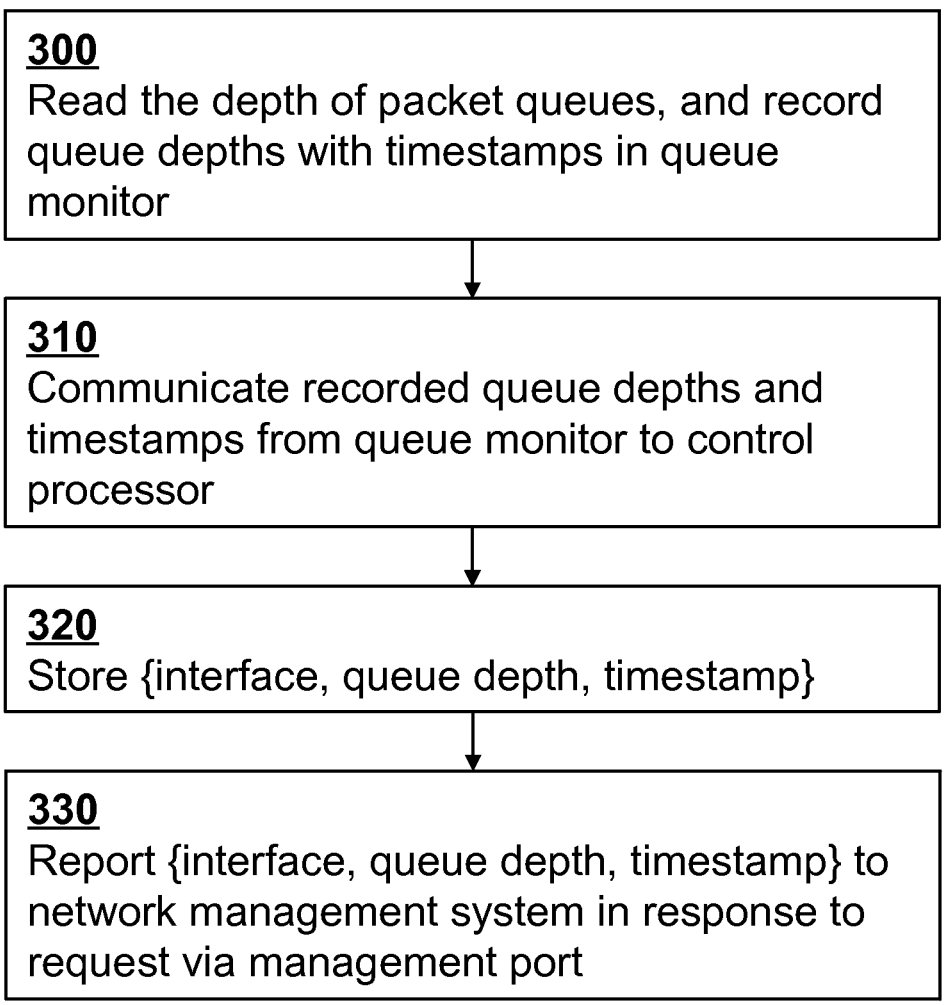
FIG. 3 is a flowchart of a method for queue monitoring implemented by a network switch, according to an embodiment of the invention.

FIG. 3 illustrates a process for measuring and recording the switch latency by taking into account the queue depth of each interface.

In step 300, at microsecond intervals or less, Queue Monitor 120 reads the queue depth of Packet Queues 150 through 153 and records the queue depth in bytes along with the exact time of the reading. In step 310, Queue Monitor 120 reports these reading to Control Processor 110. In step 320, Control processor 110 stores this data as a set {interface, queue depth, time}.

Also, in step 330, in response to an incoming request from a network management system, the switch transmits the requested recorded sets of data via management port 160. The switch may also report its specifications (e.g., speed of its interfaces) to the network management system.

A user or network management system can collect the recorded data via management port 160. The stored data is converted by the management system to latency data by taking into account the speed of the interface and the length of the queue, and therefore the time required to transmit all the data in the queue out of the interface port at that speed.

An important aspect of the present invention is that the queue length (or depth) is measured and recorded by the Queue Monitor at microsecond resolution or less. This allows the network switch to report latency and congestion conditions over extremely short time intervals. Specifically, this allows the detection and reporting of so-called microbursts, which are congestion conditions that only exist during very short time intervals and would not be detected if the packet queues were not monitored at microsecond resolution.

Numerous alternative embodiments of the principles of the invention will be evident to those skilled in the art in view of the present description. For example, a network switch can have many more interface ports and can have multiple queues per interface port. The technique for monitoring network switch latency described above can be practiced independently of the number of interface ports and can be applied irrespective of the number of packet queues per port. The Queue Monitor can be implemented in hardware logic or firmware.

In another embodiment of the invention, end-to-end latency of a network of multiple switches can be measured by adding up the latency of all network switches in the path.

In order to analyze end-to-end latency of a network, queue depth data is exported from various switching elements in the network to a central management system. Using the queue depth data overlaid with the network topology, the central management system calculates end-to-end network latency at each time unit. This technique provides fine-grained visibility to the users of short-term congestion conditions.

Figure 2:
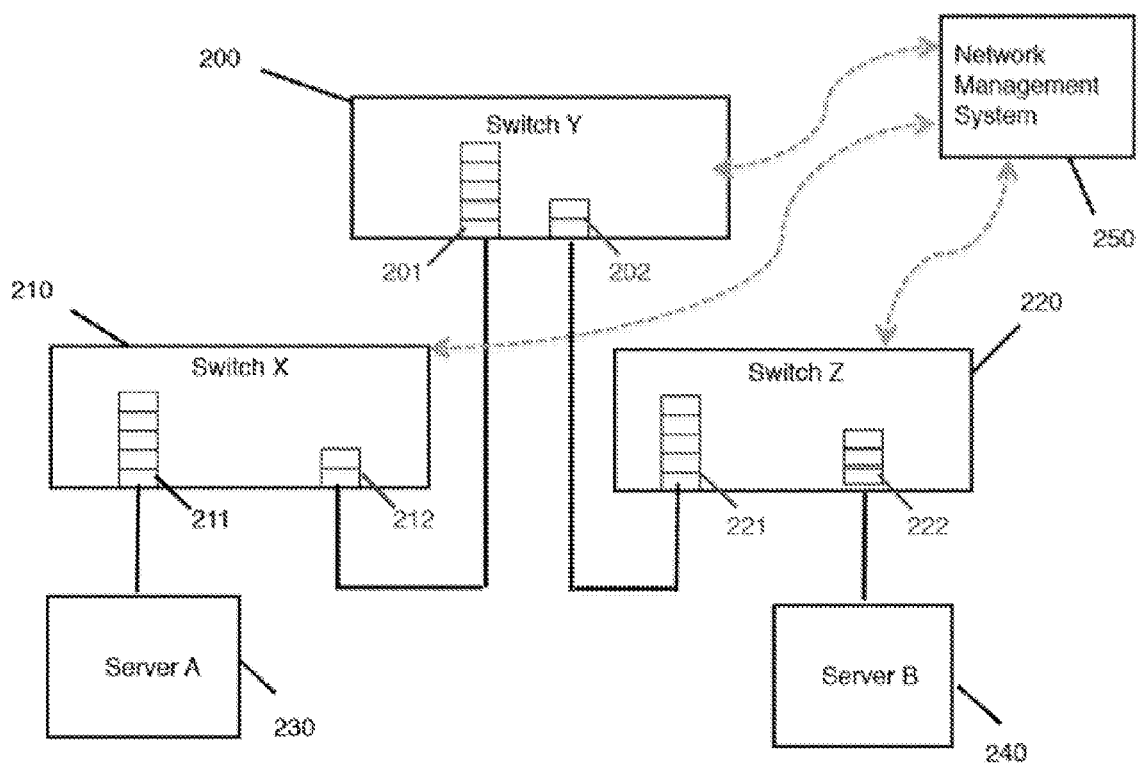
FIG. 2 is a schematic block diagram of a network including multiple network switches connected to network management system illustrating latency analysis of a multi-switch network, according to an embodiment of the invention.

FIG. 2 illustrates a network including multiple network switches 200, 210 and 220, all of which are connected to network management system 250 via their management ports (e.g., port 160 of FIG. 1). In this particular network, Switch X 210 connects to Switch Y 200, and Switch Y 200 connects to Switch Z 220. In addition, Server A 230 connects to Switch X 210 and Server B 240 connects to Switch Z, creating an end-to-end path from Server A to Server B through switches X, Y, Z. Packet Queues 201, 202 of switch 200, Queues 211, 212 of Switch 210, and Queues 221, 222 of Switch 220 are associated with the various switch interface ports, as shown.

Figure 4:
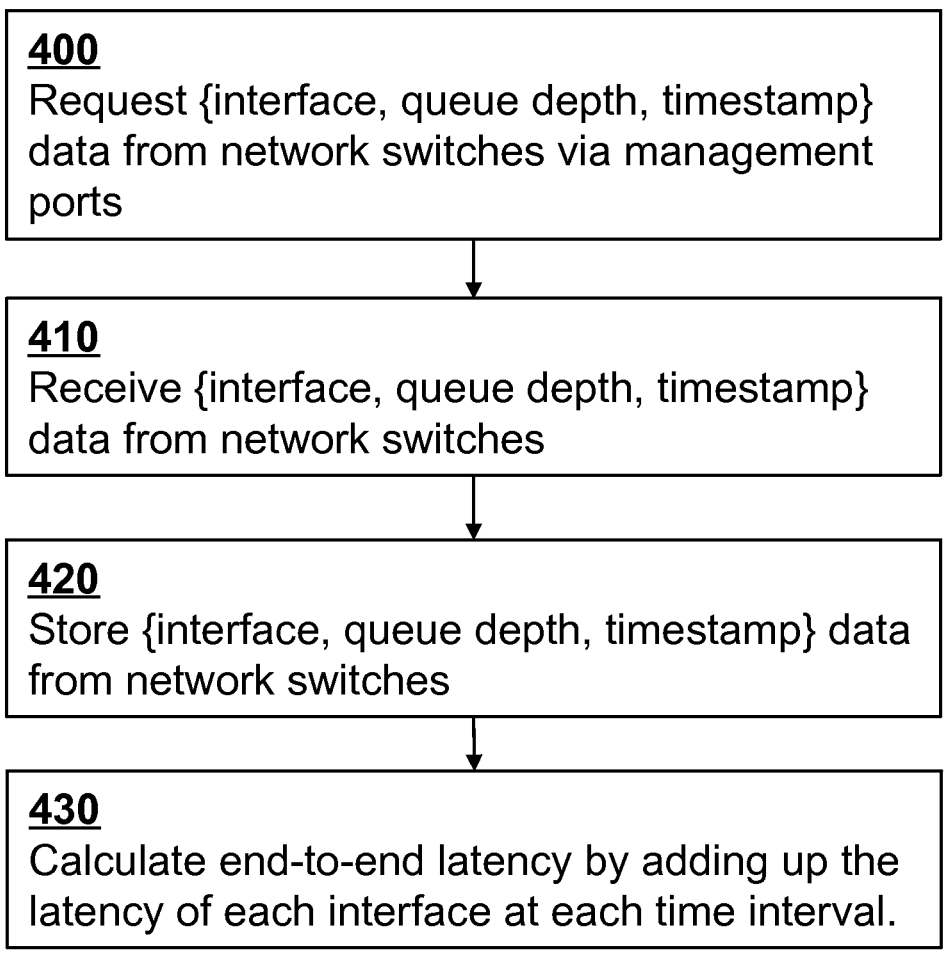
FIG. 4 is a flowchart illustrating a method to collect and analyze end-to-end latency of the network over time, according to an embodiment of the invention.

FIG. 4 is a flowchart illustrating a method to collect and analyze end-to-end latency of the network over time along a particular network path between the two ends (e.g., between two servers). In step 400, the central management system requests data from all interfaces of all switches along the path. In step 410, it receives the requested data from the switches, and in step 420 it stores the data. End-to-end latency is then calculated in step 430 by adding up the latency of each of the interfaces along the path at each time interval, resulting in very precise latency measurement for any path in the network.

In FIG. 2, for example, the end-to-end latency from Server A 230 to Server B 240 at each time interval can be measured as the sum of latencies for each of the switches 200, 210, and 220, in addition to the native forwarding latency of each networking switch without congestion and the signal propagation speed across all physical layer connections. The queue depths are translated into latencies by taking into account the transmission rate of the outgoing interface, which is typically a fixed rate based on the interface type.

For example, in order to compute the latency of the path from Server A to Server B, the sum is calculated of the latencies of the queues that a packet sent from A to B would be enqueued in at that time, which is derived from the exported queue depth at the time in question. If queue depths are substantial, a temporal correction factor may be applied to adjust for the possibility that a packet passing through queues q1 and q2 on two switches will arrive at q2 only after the latency of q1 has been applied. So if q1 has a delay of 100 ms at time T, then to measure the total delay that would be observed by a packet arriving at q1 at time T (and going from q1 through q2), q1's latency measure as of T is added to q2's latency measure as of T+100 ms. In other words, when adding a sequence of latencies in a path, the timestamps of the latency measurements used are shifted to correspond to the latencies in the path.

To achieve accurate measurements, all network switches are preferably synchronized to the same clock using any of various techniques for clock synchronization across networking devices that are well known in the industry.

The invention claimed is:

1. A method implemented by a network switch management system connected to a network comprising multiple network switches and multiple servers, the method comprising:

transmitting to the network switches requests for depths of queues together with corresponding timestamps;

receiving from the network switches the requested depths of the queues together with the corresponding timestamps;

calculating latencies of interface ports of the network switches from the received depths of the packet queues;

calculating an end-to-end latency of a path in the network between two servers, wherein calculating the end-to-end latency comprises:

identifying a first queue in a first network switch of the multiple network switches, determining a first queue depth at time T for the first queue, determining a first latency (L1) of a packet arriving at the first queue at time T using the first queue depth;

identifying a second queue III a second network switch of the multiple network switches, determining a second queue depth at time T2 no earlier than T+L1 for the second queue, and determining a second latency (L2) of the packet arriving at the second queue at time T2 using the second queue depth, wherein the first network switch and the second network switch are in the path, and wherein the end-to-end latency comprises L1 and L2.

2. The method of claim 1, wherein first queue depth is obtained from the depths of the plurality of queues received by the first network switch in response to the request by the first network switch.

3. The method of claim 2, wherein the depths of the plurality of queues are each stored in one of a plurality of records, wherein each of the records identifies an interface on the first network switch, a timestamp specifying a time, and a queue depth of a queue associated with the interface at the time.

* * * * *